United States Patent
Andriopoulou

(10) Patent No.: US 11,706,091 B2
(45) Date of Patent: Jul. 18, 2023

(54) METHOD AND A SYSTEM FOR RETRIEVING AND APPLYING DYNAMIC POLICY RULES IN A NETWORK

(71) Applicant: Unify Patente GmbH & Co. KG, Munich (DE)

(72) Inventor: Foteini Andriopoulou, Patras (GR)

(73) Assignee: Unify Patente GmbH & Co. KG, Munich (DE)

( * ) Notice: Subject to any disclaimer, the term of this patent is extended or adjusted under 35 U.S.C. 154(b) by 0 days.

(21) Appl. No.: 17/950,296

(22) Filed: Sep. 22, 2022

(65) Prior Publication Data
US 2023/0118664 A1     Apr. 20, 2023

(30) Foreign Application Priority Data
Oct. 14, 2021  (EP) ..................................... 21202603

(51) Int. Cl.
*H04L 41/0894*     (2022.01)
*H04L 9/40*     (2022.01)
*H04L 9/00*     (2022.01)

(52) U.S. Cl.
CPC .......... *H04L 41/0894* (2022.05); *H04L 63/20* (2013.01); *H04L 9/50* (2022.05)

(58) Field of Classification Search
CPC ....... H04L 9/50; H04L 41/0894; H04L 63/20; H04L 67/63; H04L 67/104; H04M 3/367; H04M 3/5116
See application file for complete search history.

(56) References Cited

U.S. PATENT DOCUMENTS

| | | | |
|---|---|---|---|
| 10,062,042 B1* | 8/2018 | Kelly | ............. G06Q 10/063112 |
| 2015/0092610 A1 | 4/2015 | Russell et al. | |
| 2020/0175155 A1* | 6/2020 | Bhamidipati | ............. H04L 9/50 |

FOREIGN PATENT DOCUMENTS

| | | |
|---|---|---|
| EP | 3103253 A1 | 12/2016 |
| WO | 2015120191 A1 | 8/2015 |
| WO | WO-2022006320 A1 * | 1/2022 |
| WO | WO-2022006324 A1 * | 1/2022 |

OTHER PUBLICATIONS

European Search Report for European Application No. 21202603.3 dated Mar. 22, 2002.
"Performance Testing for VoIP Emergency Services: a Case Study of the EMYNOS Platform and a Reflection on Potential Blockchain Utilisation for NG112 Emergency Communication" by Budankailu Sameer Kumar Subudhi, et al.; Journal of Ubiquitous Systems & Pervasive Networks; vol. 12, No. 1 (2020) pp. 01-08; 2020 International Association for Sharing Knowledge and Sustainability.

* cited by examiner

*Primary Examiner* — Gil H. Lee
(74) *Attorney, Agent, or Firm* — Buchanan Ingersoll & Rooney PC

(57) ABSTRACT

A system and method for publishing and updating policy rules in a network can be based on predictive algorithms and blockchain techniques for network systems (e.g. next generation emergency systems).

12 Claims, 14 Drawing Sheets

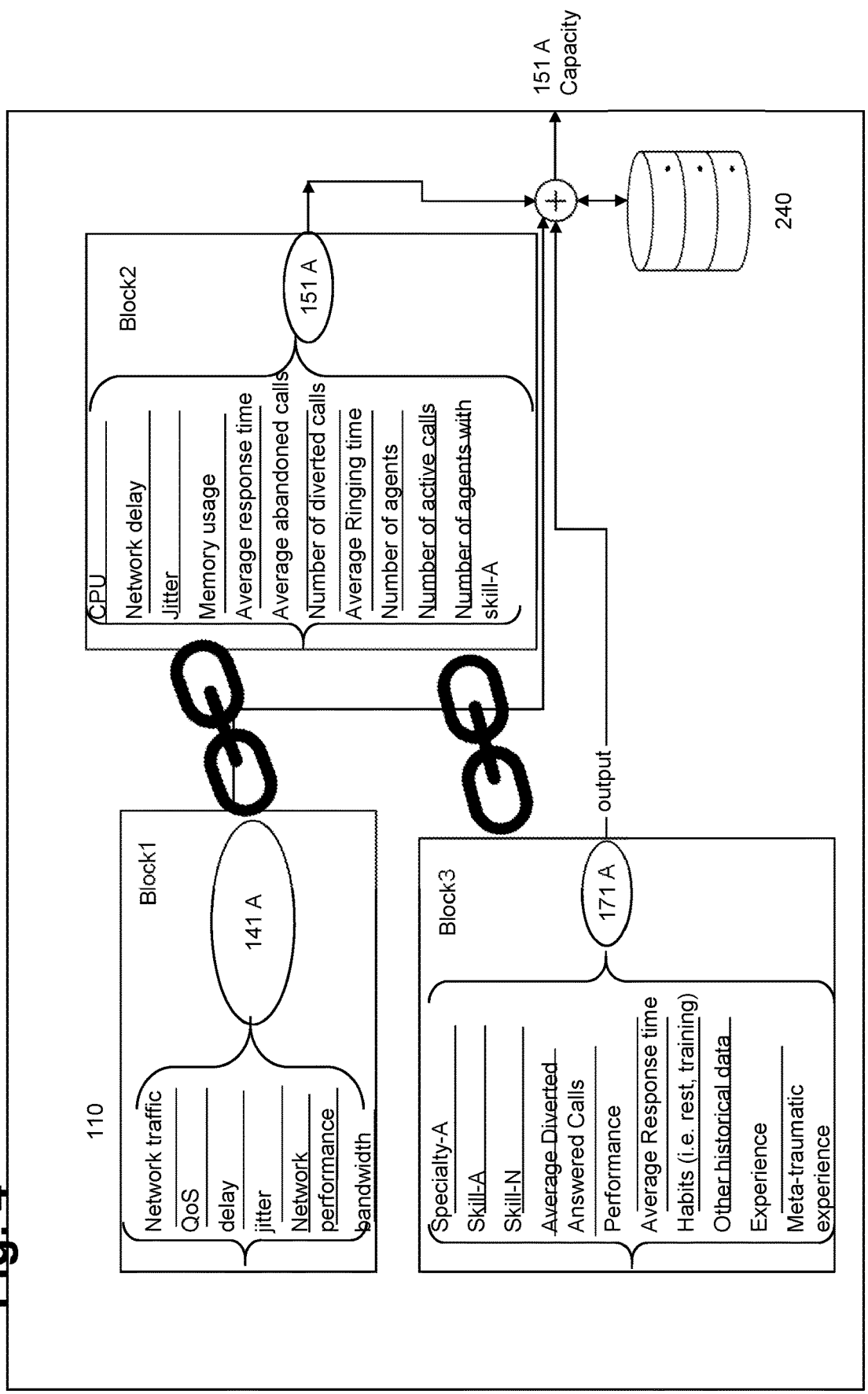

METHOD AND A SYSTEM FOR RETRIEVING AND APPLYING DYNAMIC POLICY RULES IN A NETWORK

CROSS-REFERENCE TO RELATED APPLICATIONS

The present application claims priority to European Patent Application No. EP 21 202 603.3 filed on Oct. 14, 2021. The entirety of this European patent application is incorporated by reference herein.

FIELD

The present invention relates a method and a system for retrieving and applying dynamic policy rules in a network. Embodiments of a method for retrieving and applying dynamic policy rules based on predictive algorithms and Blockchain techniques for networks (e.g. next generation emergency network systems) are provided, for example. Embodiments also can include communication systems, communication devices and communication apparatuses.

BACKGROUND

In network systems of facilities that are part of the critical infrastructure of a region, a state or a country, there is a high interest in keeping them running even in times of crisis, extreme large-scale disasters, or other events that can stress such networks.

Critical infrastructure is a term used by governments to describe assets that are essential for the functionality of a society and economy—the infrastructure. Most commonly associated with this term are facilities for shelter, heating (e.g. natural gas, fuel oil, district heating), agriculture, food production and distribution, water supply (e.g. drinking water, waste water/sewage, stemming of surface water (e.g. dikes and sluices), public health (e.g. emergencies, hospitals, ambulances), transportation systems (e.g. fuel supply, railway network, airports, harbors, inland shipping), security services (e.g. police, military), electricity generation, transmission and distribution (e.g. natural gas, fuel oil, coal, nuclear power), renewable energy which are naturally replenished on a human timescale, such as sunlight, wind, rain, tides, waves, and geothermal heat, telecommunication (e.g. coordination for successful operations). Further, the business or economic sector as well as goods and services and financial services (e.g. banking, clearing) may also be affected by such crises.

In this context, such facilities and, above all, their networks must not only operate stably and reliably in a crisis situation, but must also observe certain legal, infrastructural or other rules. Mostly or primarily, government organizations or surveillance are directly connected to these institutions or are in close contact with them.

Such critical infrastructure facilities and/or public sectors described above usually have one or more central components in their networks that handle these legal or other conditions with the help of so-called policy rules for the network.

Thereby, policy rules operate under a set of conditions that the one or more central component of the network determines and, if mandatory, the governmental organizations agree to.

SUMMARY

We have determined that in some situations (e.g. extreme situations such as. environmental events, war, etc. as well as in some cases of everyday overload situations (e.g. traffic jams, fire, etc.), the otherwise rather rigid and locally limited regulations can be extended to a wider geographical area and, if necessary, also to a wider area of responsibility, while remaining dynamic, e.g. adjusted to the current situation.

Currently, in such facility networks of critical infrastructure and/or the public sector there are preconfigured policy rules with certain priority orders and/or time slots based on multiple conditions and schemes. These rules have been inserted and updated manually to one or more network component and are maintained by the administrators of the central component. If there is any reason to reconsider and update them, the administrator of the system has to modify them manually. This means that they are static, no real time update exists and in case of large-scale disasters, they are not efficient.

I have developed a method and a corresponding system for retrieving and applying dynamic policy rules in a network. Embodiments of the system and method for making the update process of policing rules dynamic can be efficient and secure. Furthermore, embodiments can be configured to allow the entire update process to be tamper-proof, transparent and reproducible among authorized participants. Communication devices and communication apparatuses are also provided. Embodiments of these types of machines (e.g. a device, a network, a system, etc.) can be configured to utilize an embodiment of the process for retrieving and applying dynamic policy rules in a network.

A method for retrieving and applying dynamic policy rules in a network can include requesting, by one or more requesting clients, one or more tasks, from a central unit which is connected with a Policy Server of a blockchain-based Policy Store Platform, by using a client application interface; transmitting, by the central unit, the one or more tasks to the Policy Server and by indicating attributes concerning the one or more tasks; transmitting, by the Policy Server, the one or more tasks to a blockchain network of the blockchain-based Policy Store Platform; analyzing, by a predictor component of the blockchain network, the one or more tasks with the attributes and retrieving stored data of the blockchain-based policies in correlation with the network capabilities that satisfy the one or more requested task attributes; forwarding, by the predictor component, as a result a list of blockchain policy rules that satisfy the one or more tasks to the Policy Server in case blockchain policy rules are found to be satisfying; transmitting, by the Policy Server, the list of blockchain policy rules to the one or more service clients and/or the one or more requesting clients using the client application interface and the central unit; and applying, by the one or more service clients and/or the one or more requesting clients, the transmitted rules.

According to a preferred embodiment, the one or more service clients can include a device used by an agent or callee which can provide services (e.g. telecommunication services). The one or more requesting clients can include a device of a requester or caller having a task request. Examples of such clients can include a communication device that has at least one application that is run to communicate with the central until (e.g. a laptop computer, a tablet, a smart phone, a desktop personal computer, a workstation, etc.).

According to another preferred embodiment, the central unit can be an Emergency Service Routing Proxy (ESRP), the one or more service clients can be a Public Safety Answering Point (PSAP); and the one or more requesting clients can be a Telecommunication Service Provider (TSP).

According to still another preferred embodiment, an attribute can include data identifying least one of skill, qualification, meta-traumatic experience, expertise, average response time, language, multitasking, number of agents or service providers, number of active calls, number of diverted calls, number of agents or service providers with a certain skill or expertise, CPU usage, memory, historical statistics, capacity, delays, jitter, Quality of Service (QoS), network performance, bandwidth, network metrics or network traffic.

Further, according to a preferred embodiment, before the step of analyzing, by the predictor component of the blockchain network, the one or more tasks with the attributes and retrieving stored data of the blockchain-based policies in correlation with the network capabilities that satisfy the one or more requested task attributes, the predictor component can perform: (i) pre-processing of initial blocks per service client and/or per requesting client and/or per service provider or agent of the service client; (ii) perform a decision-making process which service clients are best suited to handle a certain task request; (iii) classify the service clients according to their capacity to handle a certain task request; (iv) create blockchain-based policies; and (v) store the data of the blockchain-based policies in a database of the blockchain network.

According to yet another preferred embodiment, in the case the blockchain policy rules have to be updated, the method can also include:
 marking, by a block validator, the affected blocks;
 breaking, by a transaction executor, the affected rule chains;
 re-calculating, by the decision-making process and blockchain mining techniques, the policy rules and priorities;
 updating, by a chain controller the policy rules and priorities;
 picking, by a blockchain miner, an alternative blockchain policy rule using an alternative branch of the blockchain before the affected blocks; and
 performing, by the chain controller, actions according to the alternative blockchain policy rules.

A system for retrieving and applying dynamic policy rules in a network is also provided, Embodiments of the system can be configured to perform an embodiment of the above referenced methods, for example.

In some embodiments, the system can be a communication system that includes a central unit (e.g. a server, an ESRP, etc.) configured to determine the conditions for certain policy rules and a surveillance or governmental organization device communicatively connectable to the central unit that can be configured to accept and to agree to the policy rules condition determined by the central unit. The system can also include a blockchain-based Policy Store Platform for consuming services with a Policy Server and a blockchain network, at least one or more requesting clients, and at least one or more service clients. The at least one or more requesting clients and the at least one or more service clients can be registered and/or subscribed to the blockchain-based Policy Store Platform using a client-side application interface and the Policy Server is a service provider which interacts as an intermediate message broker among the blockchain network and the client-side application network.

According to another preferred embodiment, the one or more service clients can be a device utilized by an agent or callee which can provide services and/or the one or more requesting clients can include a device used by a requester or caller having a task request. Such devices can be communication devices (e.g. smart phone, tablet, laptop computer, personal computer, etc.).

According to still another preferred embodiment, the blockchain network can include a database and a predictor component, configured to use blockchain mining and predictor algorithms to provide predictive models and/or to make decisions for transmitting a requested task. The database can be a database that is stored in a communication device (e.g. a database server, a document management server, etc.) that has a processor connected to a non-transitory memory and at least one transceiver. The predictor component could be included in the communication device or be a separate communication device configured to run at least one program defined by code that may define the blockchain mining and predictor algorithms to be performed by the device to provide predictive models and/or make determinations for transmitting a requested task. When configured as a separate device, the device can include at least one processor connected to the non-transitory memory that can have the code stored thereon for being run by the processor as well as at least one transceiver unit or other communication interface for communicative connections to other devices of the system.

Further, according to a preferred embodiment, the central unit can be an Emergency Service Routing Proxy (ESRP), the one or more service clients can include at least one Public Safety Answering Point (PSAP), and the one or more requesting clients can be at least one Telecommunication Service Provider (TSP).

Embodiments of the method and embodiments of the system can be configured to calculate, evaluate, publish and update policy rules based on predictive algorithms and blockchain techniques for systems in the area of critical infrastructure but also for a public/business sector. Thereby, a blockchain network can behave as the central system of all operations. The provided policy rules and their priorities can be securely encrypted and stored in a blockchain database. All policies can be recorded within the system and shared transparently among participants. Since they are generated, they cannot be edited or modified. In case something occurs, there is always the transaction reported as point of reference to invoke the update and inspect the update and further actions and/or processes resulting from this. Further, an automated process can be triggered whenever new or updated data and metrics are received by the blockchain network. This can help eliminate human intervention and keep the system always updated, especially when time plays a crucial role in the update process.

All these updated data can be correlated in order to provide a dynamic capacity of the network. This capacity can be re-estimated and re-evaluated whenever an event occurs. The result of all these policy rule evaluations can lead to a reliable network with high quality of service, avoid the calculation and evaluation of complex decisions under stressed conditions where time matters and minimize the risk of an overcrowded network that could become unavailable in a short period of time.

In the following, embodiments of the invention will be described in more detail, using the example of emergency call networks, as a representative example of the many use cases in critical infrastructure or public/business sector networks.

In extreme large-scale disasters, there can be a rapid explosion of emergency calls that reach the emergency systems and Public Safety Answering Points (PSAPs). This situation is further worsened with the overload calls that reach the PSAPs daily due to pandemics such as COVID-19, etc.

At the legacy PSAPs, there can be a mutual agreement among PSAPs to support them and take emergency calls under certain circumstances such as large-scale disasters, network outage, etc. Call diversion is the official term when the calls that were originally meant for one PSAP based on geolocation, are finally sent to another PSAP. Next generation (NG) emergency systems (e.g. NG 911 or NG 112) address the call diversion challenge through the Policy Store and Emergency Services Routing Proxy (ESRP) components. These components can be responsible to develop a list of rules and conditions (rulesets) to deal with its call diversion needs, called Policy Routing Rules (PRRs). The Policy Store can be the repository for the collection of PRRs for an agency (e.g., PSAP). PRRs can be entered into the Policy Store of the next generation emergency system via a Policy Store Web Service. The ESRP can make a policy-based routing decision based on the location of the calling party after evaluating the origination policy ruleset and additional information. The additional information can include PSAP state and a skill based criteria of the call agents such as the caller's language preference, etc. associated with the PSAP.

Currently, the existing solutions propose to switch from routing tables that meet certain conditions to more flexible distribution schemes where routing schemes based on multiple conditions would be applied. These rules have been inserted and updated manually to the Policy Store component and are maintained by the administrators of the ESRP. The multi-conditions criteria that are considered for the call diversion are basically the PSAPs' service state (normal or abnormal) and agents' skills (e.g. language, availability). However, I have determined that the PSAP's service state and the skill-based techniques are not efficient and adequate in order to decide the call diversion, especially when we have to deal with a large-scale disaster where numerous emergency calls are generated per second. In these cases, we deal with the challenge to overcrowd certain PSAPs while other remain idle or at a low load.

Embodiments of the system and method for publishing and updating policy rules based on predictive algorithms and blockchain techniques can permit use of a blockchain network that can behave as the central system of all operations. This can be a significant tool in order to dynamically update the policy rules applied at the Policy Store and divert the emergency calls in an efficient way to the most reliable PSAP(s) avoiding the risk of overcrowded PSAPs that could turn to be unfunctional in a short period of time, experience high waiting time and finally increase abandoned calls.

Other details, objects, and advantages of the telecommunications apparatus, system, device, non-transitory computer readable medium, and method will become apparent as the following description of certain exemplary embodiments thereof proceeds.

BRIEF DESCRIPTION OF THE DRAWINGS

The invention and embodiments thereof will be described below in further detail in connection with the drawings. The various embodiments and/or their individual sub-items and features can be combined with each other in any logical way. Even if some of the embodiments are described on the basis of emergency call networks, they are explicitly not limited to them but can also be applied to other networks of the critical infrastructure or the economy. The drawings include:

FIG. 4 shows a schematic illustration of chaining blocks of agents, PSAP and telecommunication provider according to another embodiment of the invention;

Figure 1A:
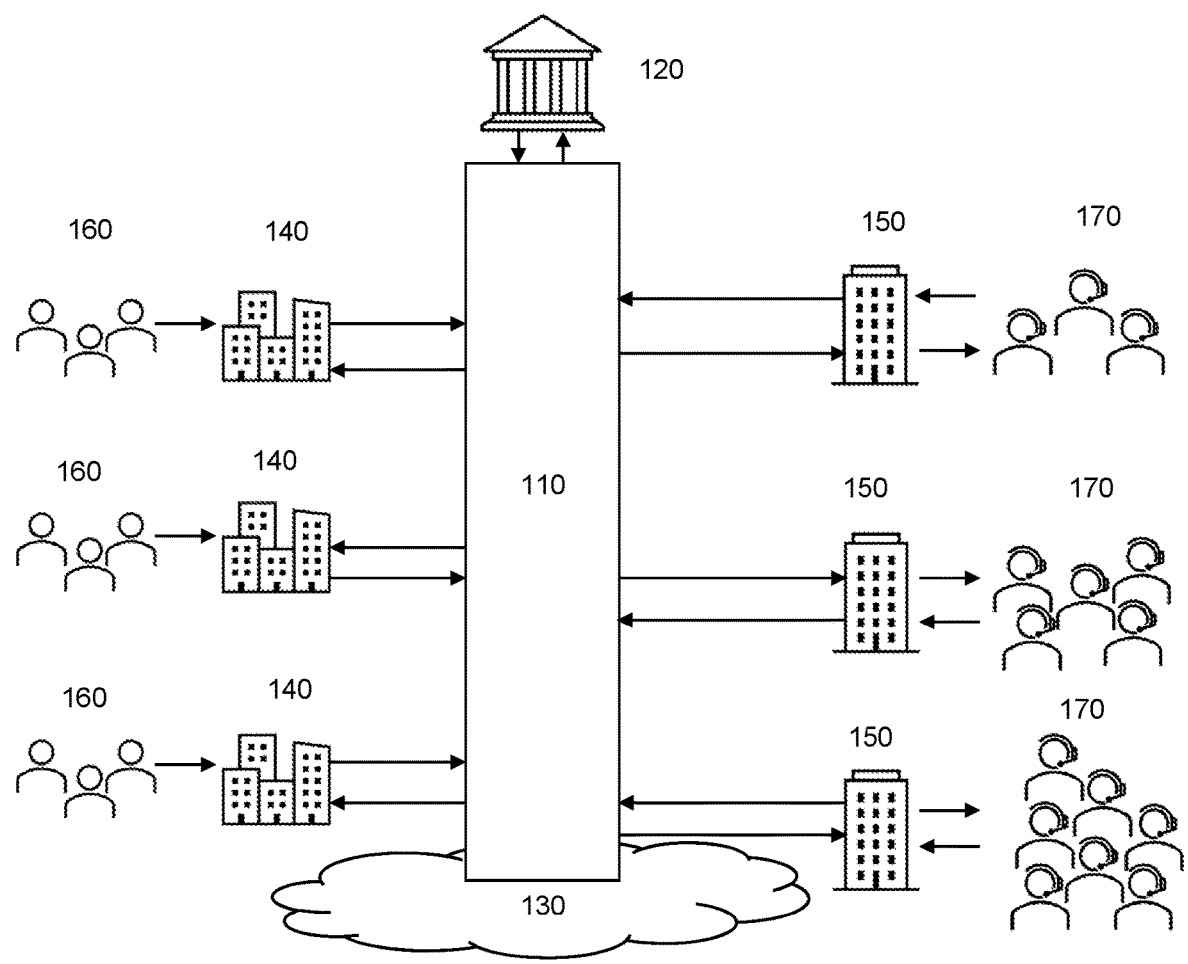
FIG. 1a shows a schematic illustration of a conceptual overview of a blockchain-based Policy Store Platform according to an embodiment of the invention.

REFERENCE NUMERALS USED IN THE DRAWINGS INCLUDE 110 blockchain-based Policy Store Platform
120 surveillance/government organization
130 central unit
131 Emergency Service Routing Proxy, ESRP
140 requesting client
141 Telecommunication Service Provider
141 A Telecommunication Service Provider A
141 B Telecommunication Service Provider B
141 N Telecommunication Service Provider N
150 service client
151 Public Safety Answering Point, PSAP
151 A Public Safety Answering Point, PSAP A
151 B Public Safety Answering Point, PSAP B
151 N Public Safety Answering Point, PSAP N
160 requester
161 emergency caller 161 A emergency caller A
161 B emergency caller B
161 N emergency caller N
170 service provider
171 agent/callee of a PSAP
171 A agent/callee of a PSAP A
171 A-1 agent/callee of a PSAP A
171 A-2 agent/callee of a PSAP A
171 A-3 agent/callee of a PSAP A
171 A-4 agent/callee of a PSAP A
171 B agent/callee of a PSAP B
171 B-1 agent/callee of a PSAP B
171 B-2 agent/callee of a PSAP B
171 B-m agent/callee of a PSAP B
171 N agent/callee of a PSAP N
171 N-1 agent/callee of a PSAP N
171 N-2 agent/callee of a PSAP N
171 N-m agent/callee of a PSAP N
200 blockchain network
230 Policy Server
240 Database
300 Client App Interface

DETAILED DESCRIPTION

FIG. 1a schematically shows a conceptual overview of a blockchain-based Policy Store Platform 110 according to an embodiment of the invention. This embodiment of the invention proposes a system and a method for applying and updating policy rules based on predictive algorithms and blockchain techniques. In this context, the policy rules and priority updates are built into the blockchain to facilitate, verify, and define the most appropriate service provider 150 or service endpoint. Policy rules operate under a set of conditions that a central unit determines, and governmental organizations 120 agree to. When those conditions are met, the policies are created in order to divert service requests efficiently and with high quality of service, avoiding the retargeting of services among various endpoints especially under stressed conditions where time matters.

As can be seen from FIG. 1a, the participants of a blockchain-based Policy Store Platform 110 in this embodiment are requesting clients 140, service clients 150 with their service providers or agents 170 and surveillance, e.g. governmental organizations 120. The clients 140, 150 are registered and certified by the surveillance, e.g. governmental organizations 120. Governmental organizations 120 supply to the blockchain platform 110 the contracts among the various service clients 150 to support each other when there are outages either scheduled or unscheduled such as a scheduled maintenance window or mass disasters. Governmental organizations 120 also verify the authorization and authentication of the service clients 150. Each service client 150 can be responsible to register and certify the active service providers or agents 170 upon their login to their specified service client application that handles different services. The information is securely encrypted and stored in a blockchain database 240 using cryptographic hash block encoded into a Merkle tree.

Figure 1B:
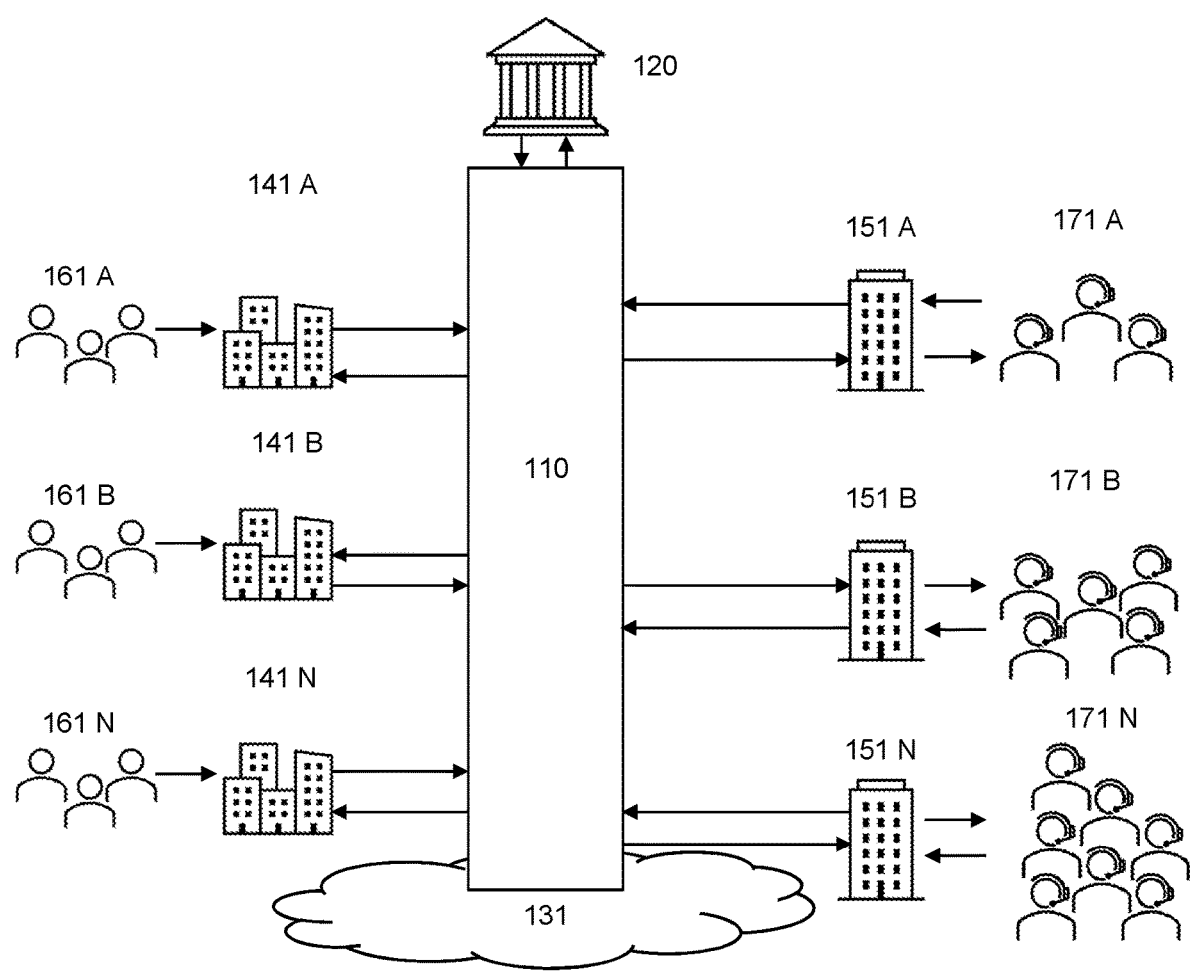
FIG. 1b shows a schematic illustration of a conceptual overview of a blockchain-based Policy Store Platform concerning an emergency network according to another embodiment of the invention.

FIG. 1b schematically shows a conceptual overview of a blockchain-based Policy Store Platform 110 concerning an emergency network according to an embodiment of the invention. Currently, no solution exists that enables dynamic policy enforcement and priority update at the emergency systems. In this context, the policy rules and priority updates are built into the blockchain to facilitate, verify, and define the most appropriate PSAP endpoints 151 A, 151 B, 151 N. Policy rules operate under a set of conditions that a ESRP 131 as a central unit (e.g. a central server, an ESRP, etc. that can include a processor connected to a non-transitory memory and at least one transceiver) determines, and governmental organizations 120 agree to. When those conditions are met, the policies are created in order to divert emergency calls efficiently and with high quality of service, avoiding the retargeting of the call among various endpoints under stressed conditions where time matters. As can be seen from FIG. 1b, the participants of a blockchain-based Policy Store Platform 110 in this embodiment are telecommunication providers 141 A, 141 B, 141 N, callers 161 A, 161 B, 161 N, PSAP endpoints 151 A, 151 B, 151 N with their active logged in call agents 171 A, 171 B, 171 N and governmental organizations 120. The telecommunication service providers 141 A, 141 B, 141 N and PSAPs 151 A, 151 B, 151 N are registered and certified by the governmental organizations 120. Governmental organizations 120 supply to the blockchain platform 110 the contracts among the various PSAPs 151 A, 151 B, 151 N to support each other when there are outages either scheduled or unscheduled such as a scheduled maintenance window or mass disasters. Governmental organizations 120 also verify the authorization and authentication of the PSAPs 151 A, 151 B, 151 N. Each PSAP 151 A, 151 B, 151 N is responsible to register and certify the active call takers 171 A, 171 B, 171 N upon their login to the PSAP application (e.g. a public safety network administration application and call handling systems) that handles emergency calls. The information is securely encrypted and stored in a blockchain database using cryptographic hash block encoded into a Merkle tree.

Figure 2:
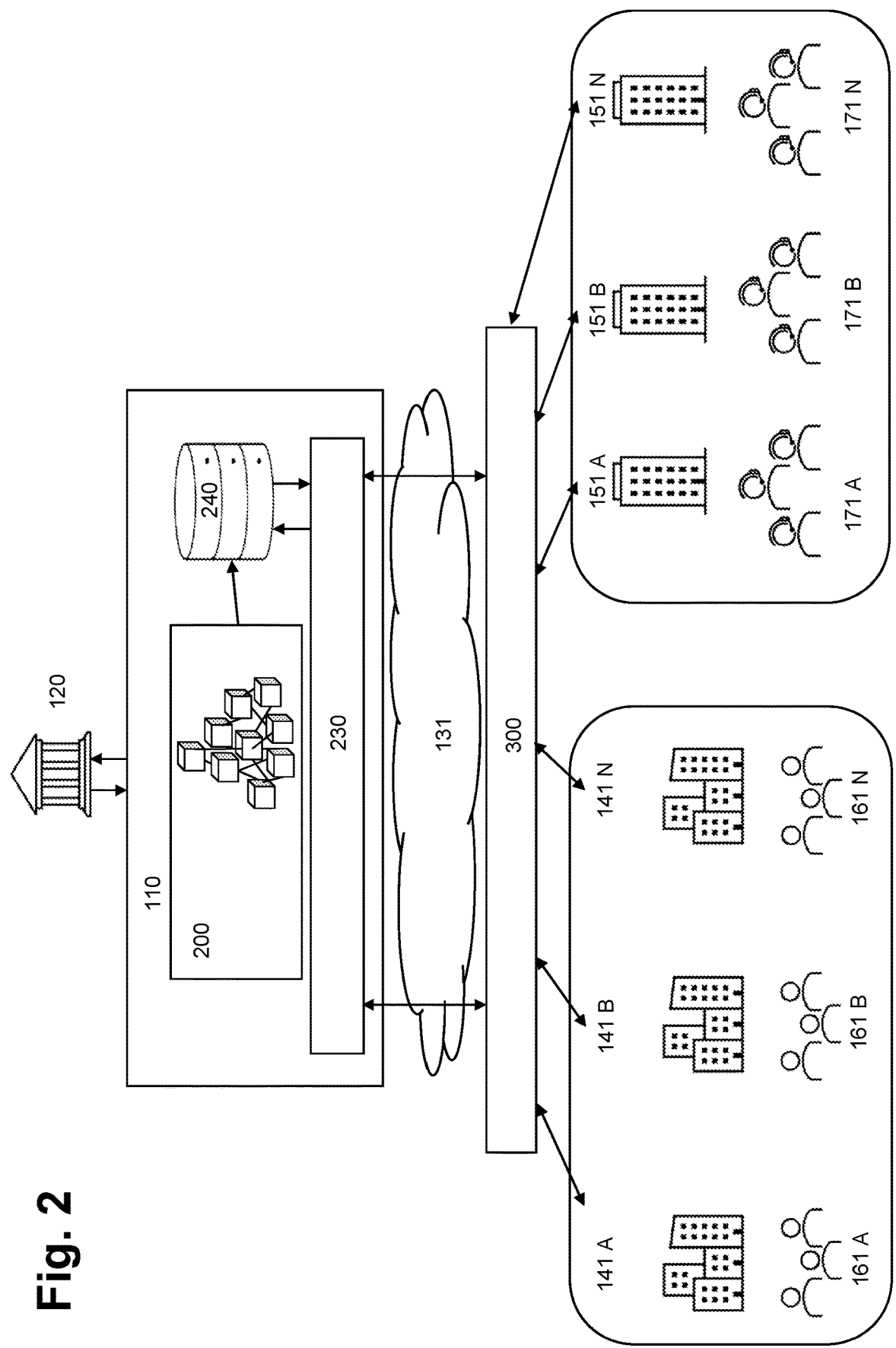
FIG. 2 shows a flowchart of the method for architectural overview of a blockchain-based Policy Store Platform concerning an emergency network according to another embodiment of the invention.

In FIG. 2 an architectural overview of a blockchain-based Policy Store Platform 110 according to another embodiment of the invention is shown. All participants of a blockchain-based Policy Store Platform 110 interact with each other through an application 300 based on the blockchain. Thereby, a client-side application 300 provides an interface to enable all PSAPs 151 A, 151 B, 151 N, telecommunication service providers 141 A, 141 B, 141 N and active call takers 171 A, 171 B, 171 N, to be registered/subscribed to the blockchain platform 110. The client application interface 300 enables them to submit transactions to the blockchain network 200 of the blockchain-based Policy Store Platform 110 for consuming services such as registration of PSAP 151 A, 151 B, 151 N, agent 171 A, 171 B, 171 N and telecommunication providers 141 A, 141 B, 141 N, notifications, and update tasks when there are changes on each participants statements or requesting to supply policy rules so as to target the calls to the appropriate endpoint. The blockchain-based Policy Store Platform 110 comprises a Policy Server 230 component and the blockchain network 200. The Policy Server 230 component is a service provider which interacts as an intermediate message broker among the blockchain network 200 and the client-side application interface 300. Blockchain network 200 facilitates the decision process and supplies the appropriate policies to the ESRP 131. Thereby, the blockchain network 200 integrates blockchain mining and predictor algorithms and tools as well as a blockchain database 240. The blockchain predictor component uses artificial intelligence algorithms and machine learning techniques in order to train algorithms using the aggregated data, provide predictive models and make decisions to target the calls to the appropriate PSAP endpoints 151 A, 151 B, 151 N based on various criteria.

Figure 3A:
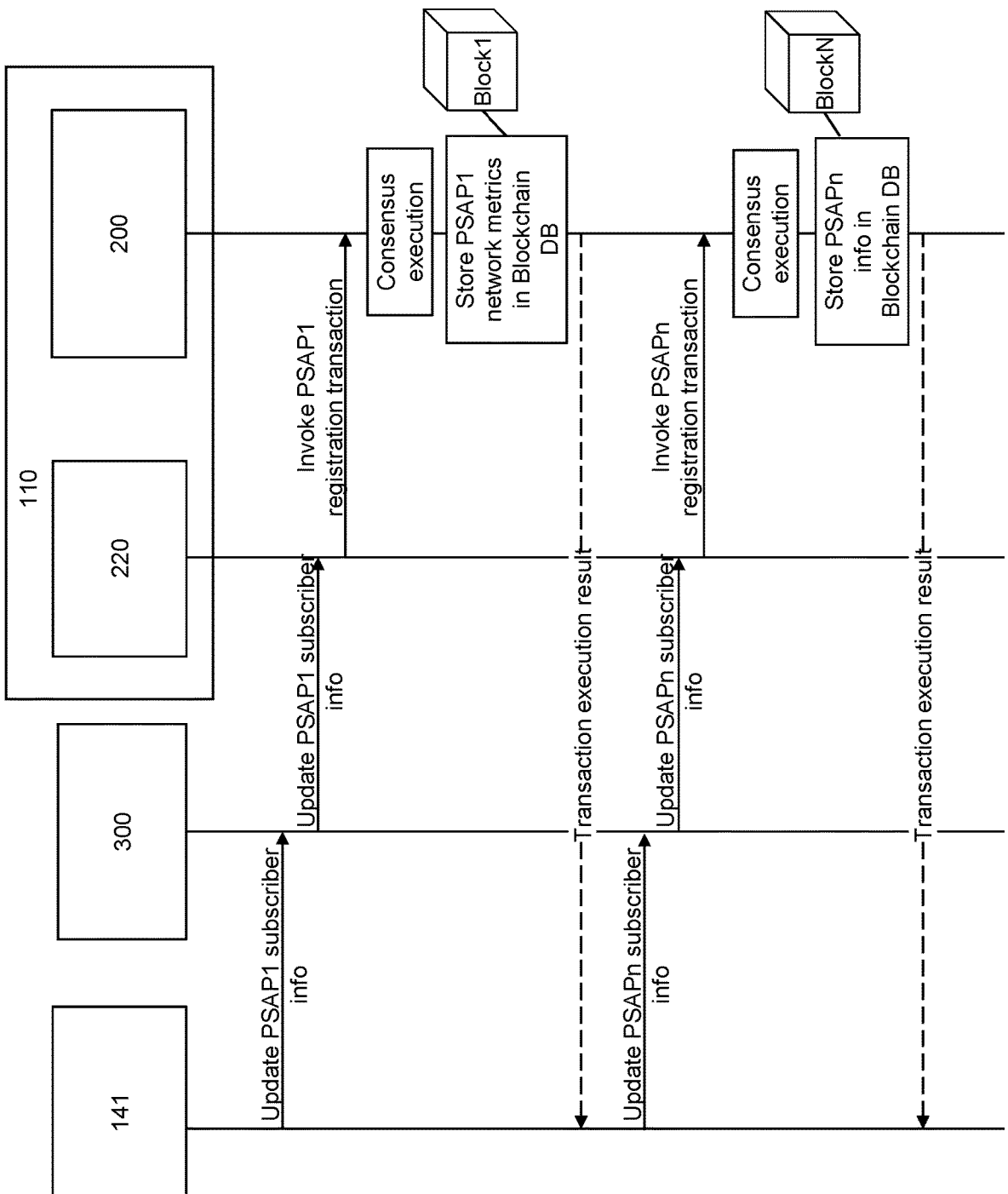
FIG. 3a shows a sequence diagram of updating telecommunication provider's info according to another embodiment of the invention.

FIG. 3a shows a sequence diagram of updating telecommunication provider's 141 information according to another embodiment of the invention. Telecommunication providers 141 measure and provide predictive metrics for PSAPs' capacity by means of network characteristics such as delays, jitter, network traffic, etc. The information regarding to each PSAP metrics is sent to a blockchain-based Policy Store Platform 110 through a client application interface 300, also called client app. A Policy Server 230 component (also called Policy Server App) receives a request to create a new transaction with the updated information of the network metrics and marks the previous one as obsolete. Before submitting the update, an enrollment is required to supply the transaction. The update is a process of requesting to read and write data to the blockchain database 240. Upon the verification of the certificates, the blockchain-based Policy Store Platform 110 is updated with the new metrics. A block representing this transaction is created. The transaction respectively the block is then forwarded to the blockchain network 200.

Figure 3B:
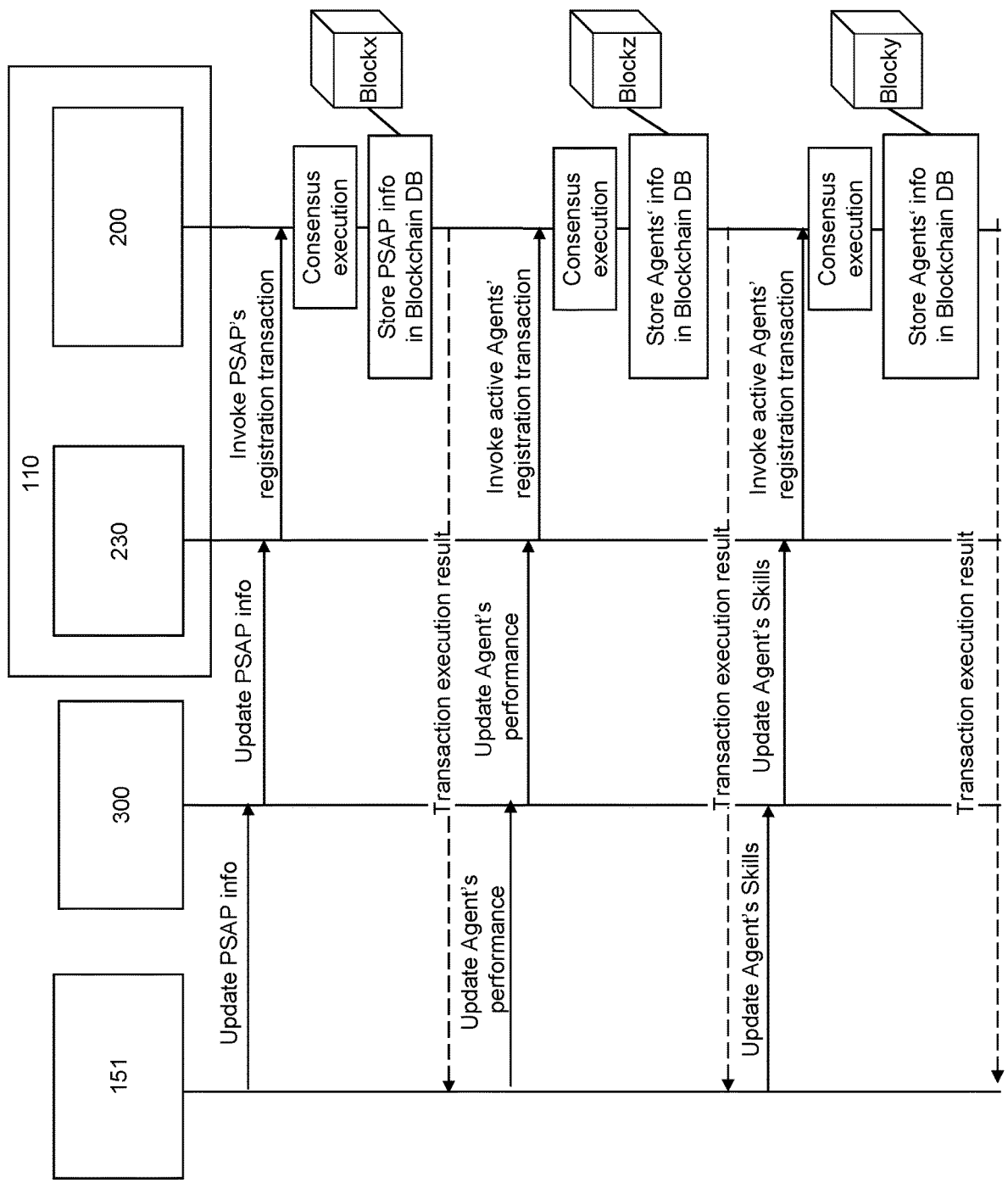
FIG. 3b shows a sequence diagram of subscribing and updating information regarding each PSAP and its agents according to another embodiment of the invention.

FIG. 3b shows a sequence diagram as in FIG. 3a, showing subscribing and updating information about each PSAP 151 and its agents. In the same way, each PSAP 151 is responsible to calculate and report information related to its capacity. PSAP's 151 capacity is not limited to its CPU usage, memory, historical statistics, and other measurements but is a dynamic attribute calculated using artificial intelligence and machine learning algorithms and correlated with various attributes that cover a wide area of network and call taker's metrics. When an agent logs in the PSAP application that handles the emergency calls, data mining and analytics algorithms are triggered in order to provide an estimation related to agent's average response time, performance, specialties (e.g. handle multiple text emergency calls, sign language, etc.), skills, etc. In this context, the PSAP information as well as the agents' information upon their login or logout to the PSAP 151 are reported to the blockchain platform 110 through the client application interface 300. When an event occurs, the updated data is reported to the Policy Server 230 component and upon their verification, they are stored at the blockchain database for further use. The transactions that correspond to this event are generated and propagated to the blockchain network 200. Blocks that represent these transactions are created.

In FIG. 4, chaining blocks of agents 171 A, PSAP 151 A and telecommunication provider 141 A are depicted. For each PSAP and its call agents, multiple blocks are created which represent the above (FIG. 3a/b) described transactions. These blocks are created based on different attributes (e.g. specialty 1, skill n, etc.) to be easily tracked. The number of the blocks per agents varies based on his/her skills, qualifications, expertise and high stressful meta-traumatic emergency incidents addressed by them (e.g. serious injured people from vehicle accidents, bomb explosions, etc.) to confront extreme emergency cases during the previous or current day which affect their performance. The agents' blocks are then used as input and can be correlated with the PSAP's blocks and the telecommunication provider's blocks in order to create chains that satisfy certain criteria such as handle Spanish voice calls, etc. In FIG. 4, for example, a chain of 3 blocks is shown. Block 1 contains attributes of telecommunication provider-A 141 A. This in turn is linked to Block 2, which contains attributes of PSAP-A, 151 A. This Block 2 is in turn linked to Block 3 which contains attributes of the PSAP agent-A 171 A. In all transactions, blocks are recorded within the system and shared transparently among the participants. Since they are generated, they cannot be edited or modified. In this manner blockchain provides trust and ensures the wide spread of the transactions.

The process of applying and updating dynamic policies is described subsequently on the basis of FIG. 5. When emergency calls arrive at the ESRP 131 component, the ESPR 131 component is responsible to target the emergency calls to the most appropriate PSAP 151 based on various aspects of call routing policy rules. The ESRP 131 can perform task requests through the client application 300 to the Policy Server 230 with more complex criteria so as to efficiently target calls to the most suitable PSAPs 151 avoiding multiple hops with uncertainty of the outcome. Thus, the ESRP 131 requests to receive the transactions, by means of chain of blocks that correspond to the policy rules, in order to target the incoming calls to the appropriate endpoints based on various attributes such as their geolocation data, the type of the call, the number of the incoming calls as well as some special requirements for skills, etc. These requests are propagated to the blockchain network. Based on the collected information from the transactions per agents, PSAPs 151 and telecommunication network metrics, as described above (FIG. 3a, FIG. 3b and FIG. 4), the blockchain predictor component of the blockchain network 200 analyzes the requested data, retrieves the stored data per PSAP 151 and agents, and makes decisions on which PSAPs 151 and agents in correlation with the network capabilities satisfy the requested criteria. The output of the decision process is a list of blockchains, policy rules, that satisfy the request task.

Figure 5:
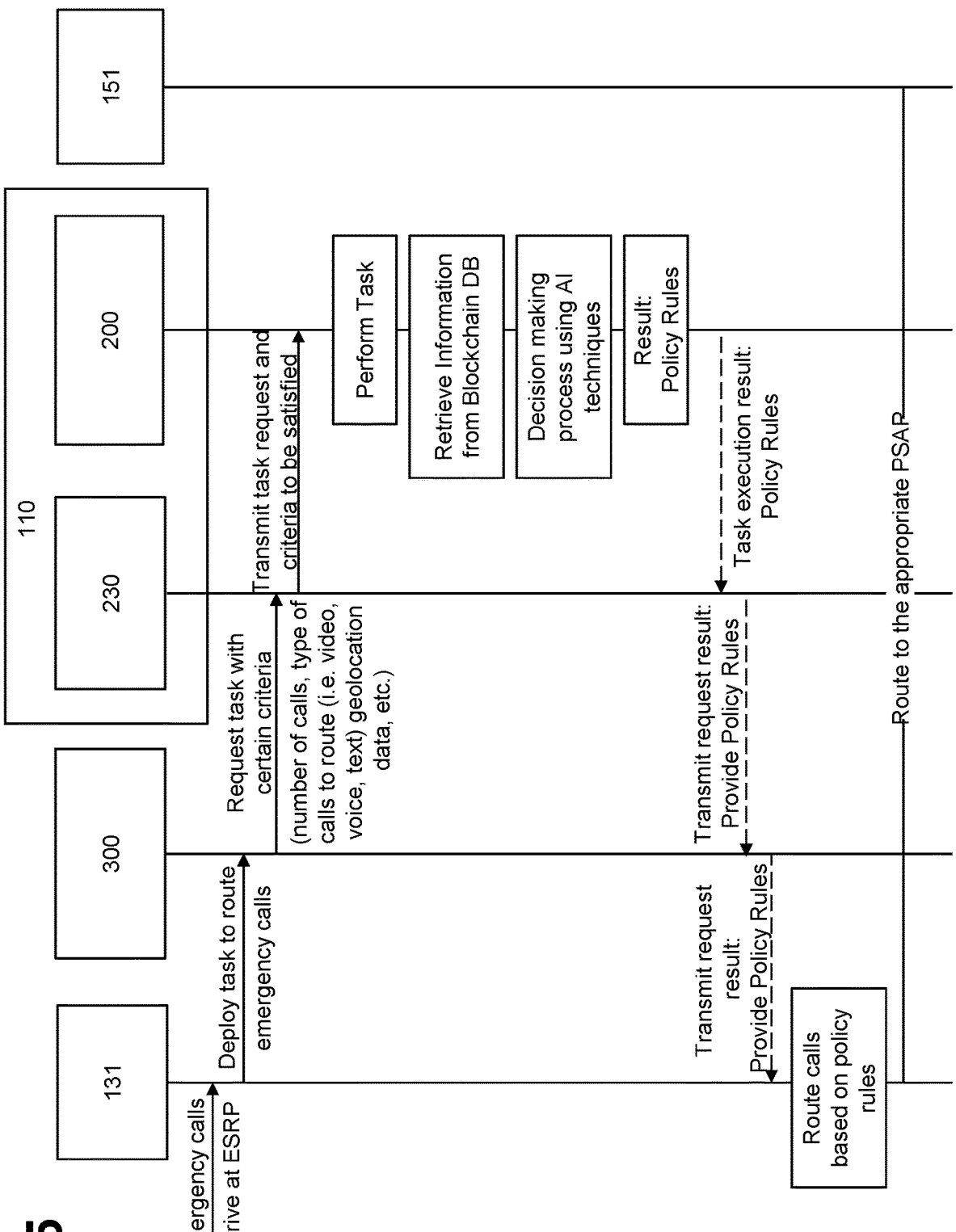
FIG. 5 shows a sequence diagram of retrieving and applying dynamic policy rules according to another embodiment of the invention.

As presented in FIG. 5, the result of the policies is forwarded to the Policy Server 230 which transmits the policies to the client application 300 and the ESRP 131 component. The ESRP 131 component applies these policies to the emergency calls and routes them to the indicated PSAP 151 endpoint(s). In the following, the decision process will be described in greater detail. Inside the blockchain-based Policy Store Platform 110, the blockchain predictor component uses training algorithms and predictive models to determine a set of learning models. Each training algorithm is fed with preprocessed data of available variables e.g. agents' blocks, the number of the incoming calls, PSAP 151 and agent historical data, etc. The output of this regression process is a set of decision models that can be used to estimate the datasets into weighted relationships which can be tracked and automated with the adoption of blockchain technology. The PSAP's 151 and telecommunication provider's blocks created during the update transaction process are preprocessed with the trained data and correlated with each other in order to estimate the PSAP 151 capacity to handle the different types of calls and target the calls to the appropriate PSAP 151 endpoint(s). The output of a block can be used as an input for other blocks creating chain(s) of blocks that represent(s) transactions able to satisfy certain policies provided by the learning algorithms.

Figure 6A:
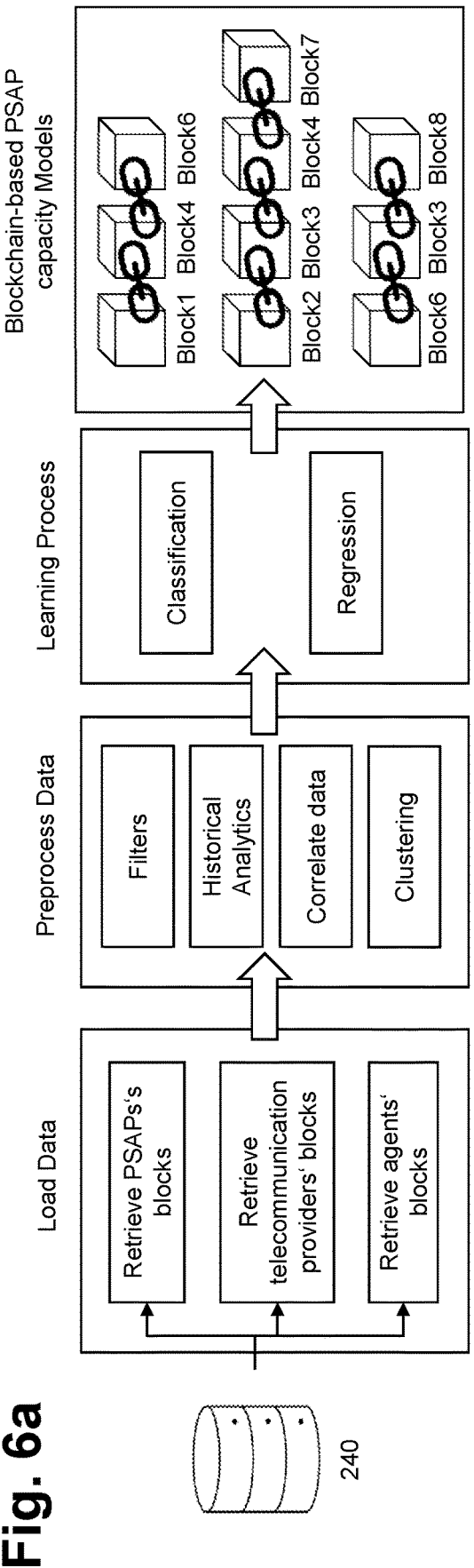
FIG. 6a shows a schematic illustration of a training process inside the blockchain network according to another embodiment of the invention.
Figure 6B:
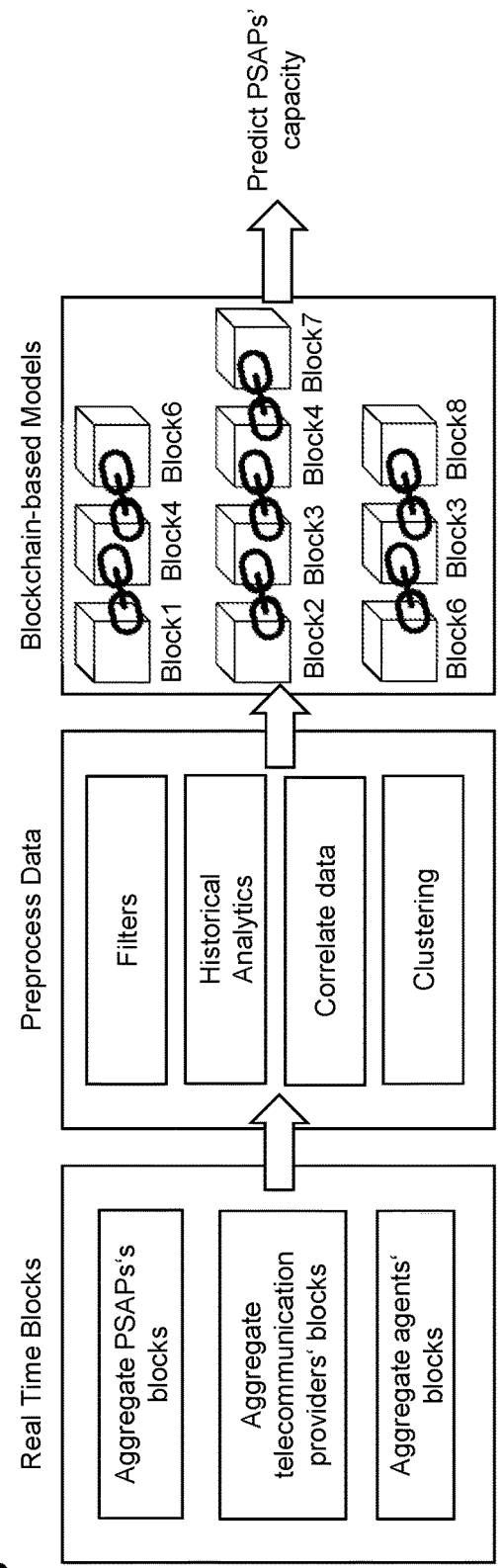
FIG. 6b shows a schematic illustration of a prediction process inside the blockchain network according to another embodiment of the invention.

A visual description of the training and predictive process inside the blockchain network is presented in FIG. 6a for the training process and in FIG. 6b for the prediction process. In the first step of the training process, data is loaded from the blockchain database 240. In this example these are PSAP blocks, telecommunication provider blocks and agent blocks. In the next step, the data is preprocessed using filters, historical analysis, correlated data and clustering. The next step is the learning process where a classification and regression of the data is performed. As a result of this learning process, different blockchain-based PSAP capacity models are obtained. In the prediction process, real-time blocks are processed. For example, aggregated blocks of PSAPs, telecommunication providers or agents are processed. These data blocks are first preprocessed, which means that various filters, historical analyses, correlated data and clustering can be applied. As a result, blockchain-based models are obtained from which the PSAP capacity can be predicted.

Figure 7:
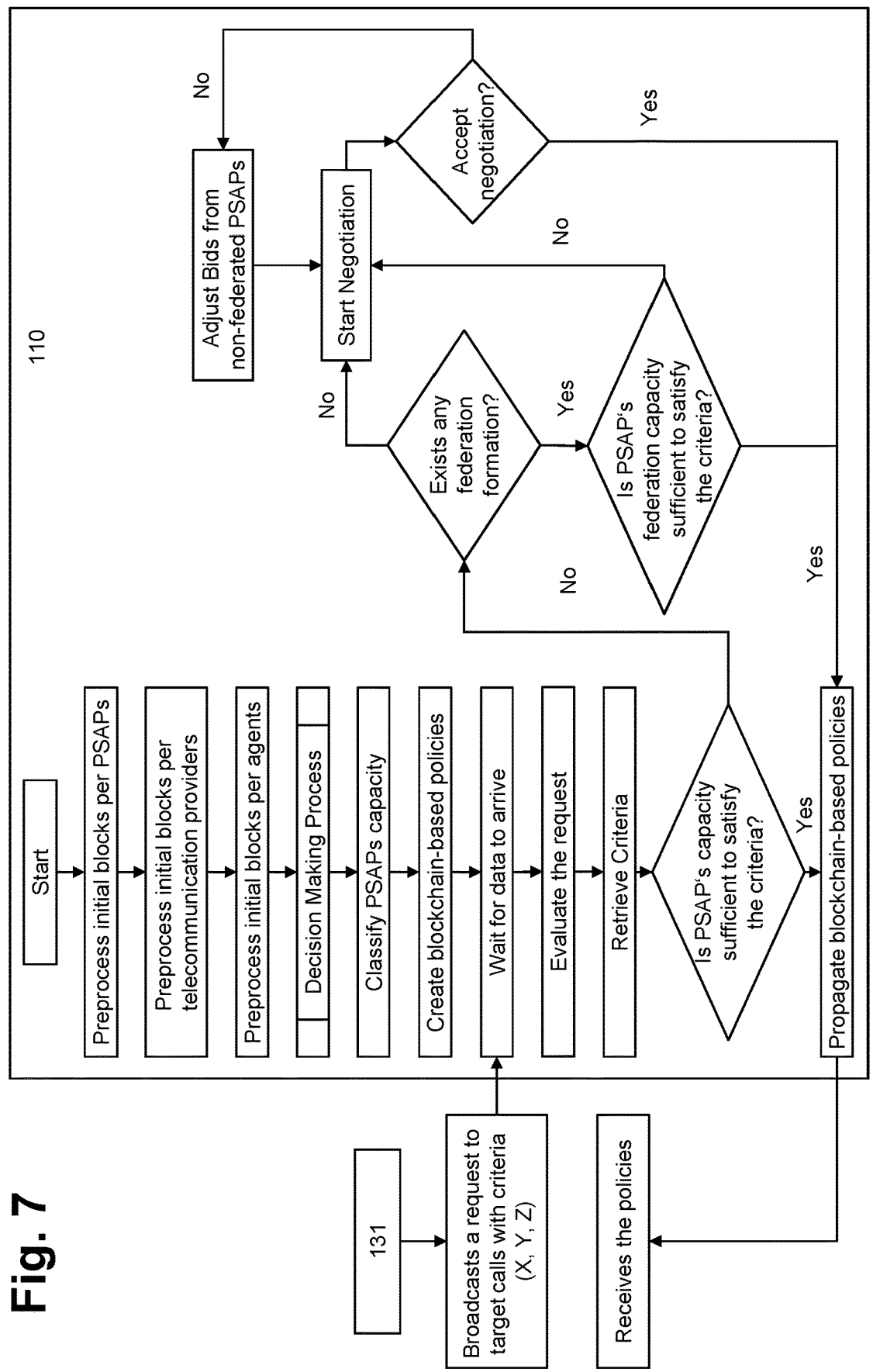
FIG. 7 shows a flow diagram of the decision process for applying dynamic policies according to another embodiment of the invention.

Whenever a request from ESRP 131 arrives at the blockchain-based Policy Store Platform 110, the criteria of the request are analyzed, and the existing blockchain-based policies are evaluated. In FIG. 7, for example, a request is made to the blockchain Policy Store Platform 110 regarding target calls with criteria (X, Y, Z). If the PSAP's capacity, in the caller's location, is sufficient to satisfy the request, the policies are transmitted to the ESRP 131. If the PSAP's capacity is not sufficient, then cooperative models from different PSAPs are requested and applied. In case that no cooperative model to satisfy the criteria exists, the negotiation process with the remaining PSAPs takes place through the blockchain network. The PSAP with the highest weighted capacity after the negotiation process would be selected and the appropriate policies would be sent. In both the cases, the blockchain network is triggered to identify the blockchains that were affected and provides new predictive models and capacities for these PSAPs (FIG. 7).

Figure 8:
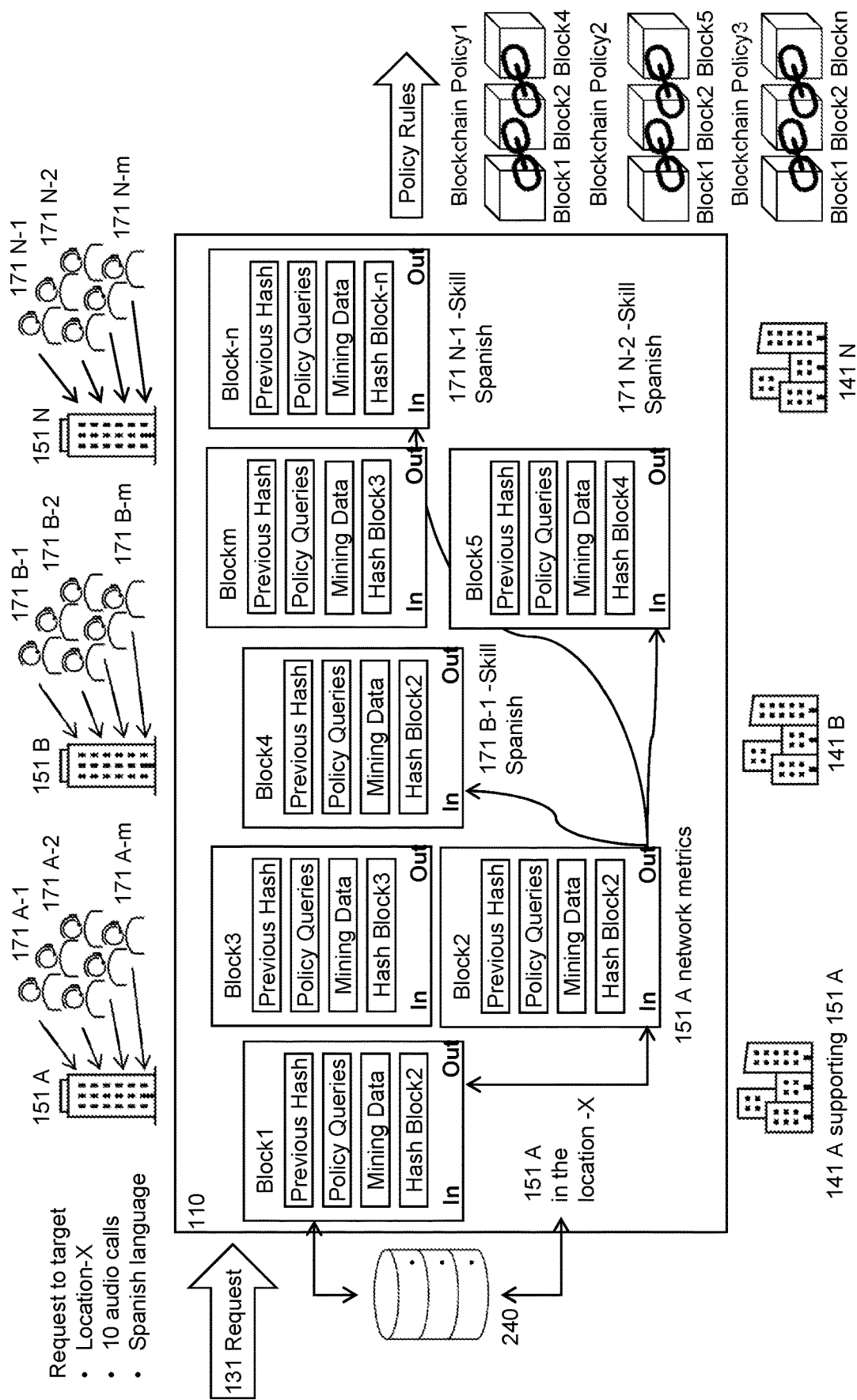
FIG. 8 shows a schematic illustration of blockchain-based dynamic policy creation based on requested parameters according to another embodiment of the invention.

Blockchain-based dynamic policy creation based on requested parameters according to another embodiment of the invention for a specific example is depicted in FIG. 8. For this example, it is assumed that a request to target 10 Spanish audio calls located at location-x requested by the ESRP 131 is made. The blocks that correspond to this location are retrieved and validated. If the PSAP 151 A block(s) at the location-x is/are valid according to stored trained data in the database 230, then the network metrics from the telecommunication provider(s) 141 A that support the PSAP 151 A are evaluated. In case the network metrics are sufficient to handle the number of calls, then the telecommunication provider 141 A is valid to take it into account for the chaining block process. Then the agent's 171 B-1 block is chained with its PSAP 151 A block and the block of the network metrics for the PSAP 151 B that the agent belongs to. A chain with these blocks corresponds to a rule that the current agent 171 B-1 is able to handle m-number of x-type emergency calls in a predefined period of time. Another chain exists that corresponds to the rule of handle n-number of y-type of emergency calls. Respectively, several chains for less complicated or more complicated scenarios are created based on the PSAPs 151 A, 151 B, 151 N capacity and the training.

Figure 9:
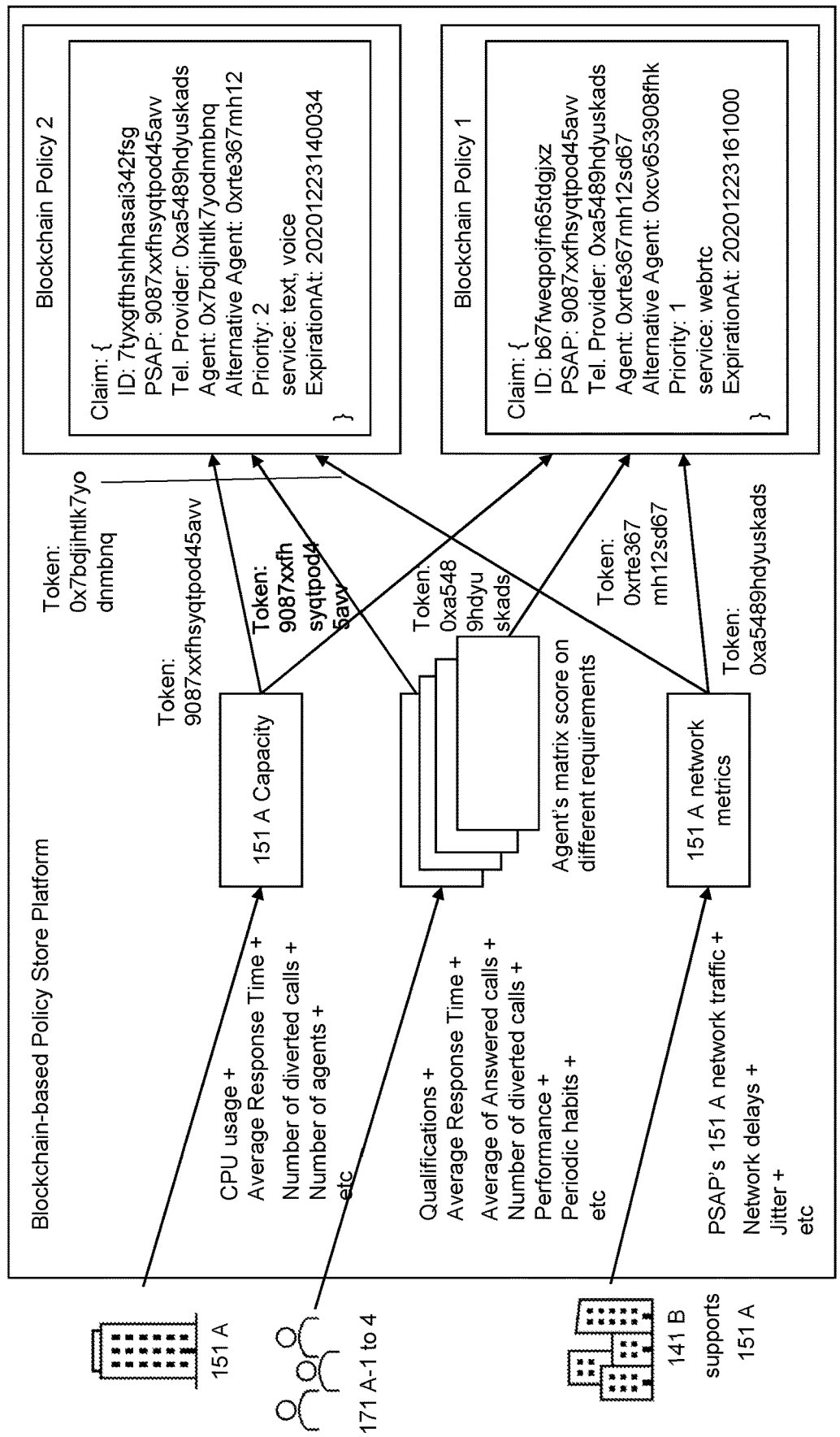
FIG. 9 shows a schematic illustration of blockchain policy creation integrating multiple blocks according to another embodiment of the invention.

For more complex requirements, when there are multiple types of calls that require, for example, different network bandwidth, the applied predictive methods may be based on historical statistics and current monitoring metrics provide estimation of the capacity of the PSAP 151 A, meaning the maximum calls that can be handled, the average waiting time for a diverted call in the queue classified with the agent's 171 A-1 to 4 characteristics. In this case telecommunication service provider 141 B supports PASP 151 A and provides its network metrics. Multiple chains are created, each one declares a distinct policy with its priority order (see FIG. 9). For example, blockchain-based policy 1 would be used to target the x webRTC calls to the Agent 171 A-1 (Agent 0xrte367mh12sd67) and alternate Agent 171 A-2 (Agent 0xcv653908fhk) while the policy-2 would be used to target the remaining text and audio calls to the Agents 171 A-3 0x7bdjihtlk7yodnmbnq and 171 A-4 0xrte367mh12 respectively. The ESRP 131 would be able to send these types of calls to these Agents until the expiration of the policy in case there is no further update.

Figure 10A:
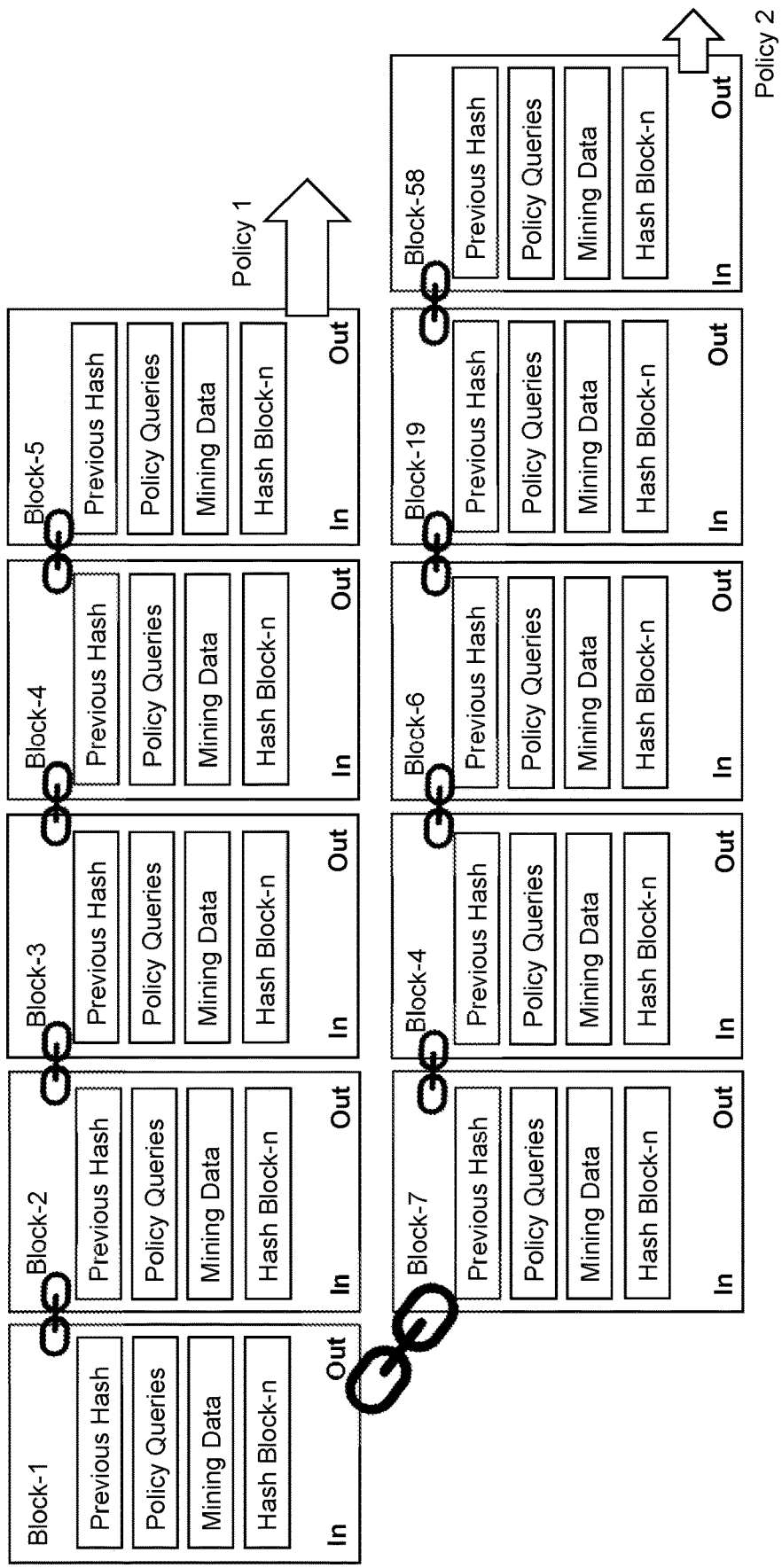
FIG. 10a shows a schematic illustration of policies stored in a blockchain system according to another embodiment of the invention.
Figure 10B:
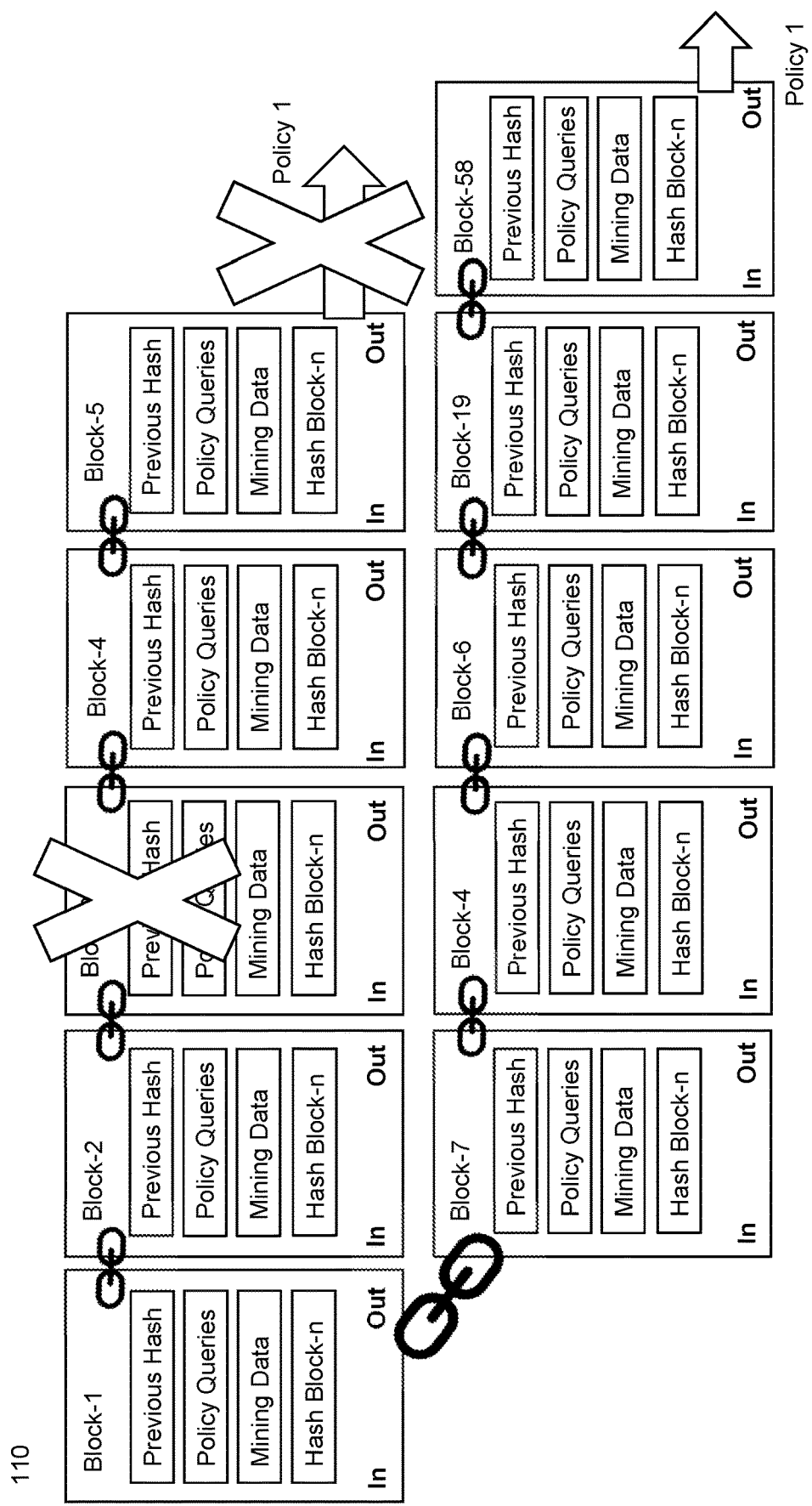
FIG. 10b shows a schematic illustration of updated policies in a blockchain platform according to another embodiment of the invention.

These policy blockchains can be updated dynamically when an agent logs in or out the PSAP as well as when the network metrics and PSAP capacity change (see FIG. 10*a*). For example, when high traffic is identified by the telecommunication providers for a specific PSAP(s), an update request is propagated to the blockchain network. Each entity of the blockchain network is informed and updated with the latest information. This triggers the blockchain predictive mechanism of identifying the chains and blocks that are affected, updating the existing chains, and creating new blocks and chains for the new policies (see FIG. 10*b*). This means that when a request arrives at the blockchain network to requesting to divert calls to other PSAPs, the policy rules and the priorities at the Policy Store 110 side are updated with each PSAP's status and saturation level in order to divert emergency calls to the most suitable PSAP(s) avoiding overcrowded PSAPs.

Figure 11:
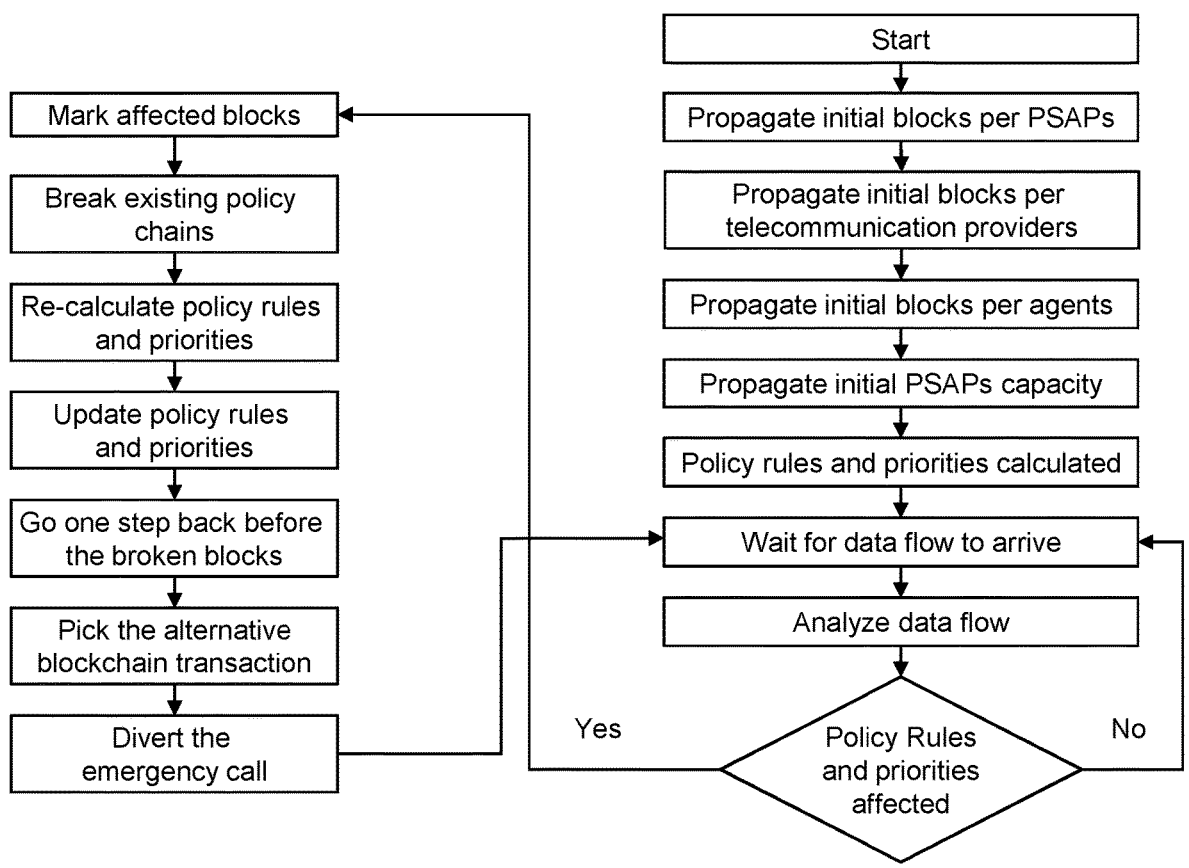
FIG. 11 shows a flowchart of blockchain-based policy update process according to another embodiment of the invention.

FIG. 11 shows a flowchart of a blockchain-based policy update process according to another embodiment of the invention. In the example shown in FIG. 11, the initial blocks are first propagated per PSAP, per telecommunications provider and per agents, and the initial PSAPs capacity is thus propagated. Then, the policy rules and priorities for various events are calculated and stored in the database. The blockchain network now waits for incoming data and analyzes it continuously. If the policy rules and priorities are affected by incoming data and their processing, an update process is initiated. In a first step of the update process the affected blocks are marked and a break of existing policy chains occurs. Then the policy rules and priorities are recalculated and updated. Afterwards, the chain is moved in front of the disconnected block and an alternative blockchain transaction is selected. The emergency call is then diverted.

EXAMPLES

In an evaluated case study for an embodiment of the system, it was assumed that four PSAPs exist, located in the Unites States of America at different states: Florida, California, New York and Arizona. An extremist bomb attack was simulated as occurring at the most overcrowded mall at New York City near the PSAP facilities while a serious tsunami or hurricane devastated a wide range of Miami. For this case study in this example situation, the New York PSAP needs to be evacuated immediately due to the risk of a second explosion in the nearby area. So, the vast amount of incoming emergency calls that report victims should be diverted to other PSAPs. Based on the existing policy rules, the candidate PSAP to receive the diverted calls is the Florida PSAP. However, the Florida PSAP experiences a high load of emergency calls due to the tsunami or hurricane. Based on the existing solution, if there is not any manual intervention to downgrade the priority of Florida PSAP and upgrade the priority of California PSAP, calls will arrive at the Florida PSAP increasing the call traffic and the waiting time to respond to emergency calls. At the same time Arizona's PSAP remains idle and California's PSAP receives low traffic even if it has high capacity by means of numerous call agents that could handle the waiting calls at Florida call queue.

An embodiment of the proposed blockchain-based system discussed above can address all these challenges in order to distribute the diverted calls to the PSAPs that could handle the high demands for response with minimum response time better without scarifying the caller's needs (e.g. receive only text calls, real time text, video, etc). To achieve this, a blockchain-based system and method that enable the dynamic calculation of each of these PSAP's capacity considered network, infrastructure and agent's attributes as discussed above can be utilized. Machine learning algorithms and predictive models can be applied to each PSAP in order to estimate each call taker's performance, matrix score to deal with different call demands and correlate these data with PSAP's metrics and attributes. In this above example, the New York, California, Arizona and Florida PSAPs' capacities are calculated dynamically. When the New York City's PSAP is marked as unavailable due to the evacuation plans, the request for diverted PSAP is propagated to the blockchain network. All the chains that contain nodes of the New York's PSAP and its agents break. Based on the blockchain predictor's analysis, the priorities are updated and the PSAP with the highest capacity can be used for the diverted calls. The Florida PSAP has high traffic due to tsunami or hurricane events. Its capacity is lower than the Arizona PSAP's capacity which is smaller than California's PSAP. Therefore, the California PSAP will be the most appropriate to manage all the load of the emergency calls. Based on the existing chains for California's PSAP, the diverted calls will be further distributed to the most appropriate call agents. Requests for specific skills that cannot be served from this PSAP but could be served from the Arizona's PSAP are diverted directly in case of available capacity without remaining in queues managed by supervisors or further redirection when answering of the identified PSAP. In this example, it was assumed that California's PSAP has the appropriate capacity to serve all the emergency calls. Nevertheless, this decision is not straight forward. Based on the proposed dynamic mechanism to update the Policy Store priorities and indicate the appropriate policy, in case the California PSAP's capacity is measured later as smaller that Arizona PSAP's capacity, then the routing will be reconsidered, and the calls will be diverted to Arizona's PSAP as long as its capacity was greater than others PSAPs. The calls can be diverted to PSAPs without exhausting their capacity so as to be able to manage not only their calls and the diverted calls but also remain in a healthy state without putting on risk their responsiveness in case of another unpredictable event.

It should also be appreciated that different embodiments of the method, communication system, and communication apparatus can be developed to meet different sets of design criteria. For example, the particular type of network connection, server configuration or client configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, terminal device, a network, a server, a communication system, and methods of making and using the same have been shown and described above, it is to be distinctly understood that the invention is not limited thereto but may be otherwise variously embodied and practiced within the scope of the following claims.

What is claimed is:

1. A method for retrieving and applying dynamic policy rules in a network, comprising:
   requesting, by at least one requesting client, one or more tasks from a central unit which is connected with a Policy Server of a blockchain-based Policy Store Platform by using a client application interface;
   transmitting, by the central unit, the one or more task to the Policy Server with data indicating attributes concerning the one or more tasks;
   transmitting, by the Policy Server, the one or more tasks to a blockchain network of the blockchain-based Policy Store Platform;
   analyzing, by a predictor component of the blockchain network, the one or more tasks with the attributes and retrieving stored data of blockchain-based policies in correlation with network capabilities that satisfy the one or more requested task attributes;
   forwarding, by the predictor component, a list of blockchain policy rules that satisfy the one or more tasks to the Policy Server;
   transmitting, by the Policy Server, the list of blockchain policy rules to one or more service clients and the at least one requesting client using the client application interface and the central unit;
   applying, by the one or more service clients and/or the at least one requesting client the transmitted rules.

2. The method according to claim 1, wherein the one or more service clients further comprising a communication device of an agent or callee which can provide services and/or the at least one requesting client includes a communication device of a requester or caller having a task request.

3. The method of claim 1, wherein the central unit is an Emergency Service Routing Proxy (ESRP), the one or more service clients include at least one Public Safety Answering Point (PSAP); and the at least one requesting client includes at least one telecommunication service provider (TSP).

4. The method of claim 1, wherein the attributes comprises data identifying at least one of skill, qualification, meta-traumatic experience, expertise, average response time, language, multitasking, number of agents or service providers, number of active calls, number of diverted calls, number of agents or service providers with a certain skill or expertise, CPU usage, memory, historical statistics, capacity, delays, jitter, Quality of Service, QoS, network performance, bandwidth, network metrics or network traffic.

5. The method of claim 1, wherein the method also comprises:
   before the analyzing of the one or more tasks, the predictor component performing at least one of:
   preprocessing initial blocks per service client and/or per requesting client and/or per service provider or agent of the service client;
   performing a decision-making process to determine which service clients are best suited to handle a certain task request;
   classifying the service clients according to their capacity to handle a certain task request;
   creating blockchain-based policies; and
   storing the data of the blockchain based policies in a database of the blockchain network.

6. The method of claim 1, also comprising:
   in response to the blockchain policy rules being updated:
   marking, by a block validator, the affected blocks;
   breaking, by a transaction executor, the affected rule chains;
   re-calculating, by the decision-making process and blockchain mining techniques, the policy rules and priorities;
   updating, by a chain controller, the policy rules and priorities;

picking, by a blockchain miner, an alternative blockchain policy rule using an alternative branch of the blockchain before the affected blocks; and performing, by the chain controller, actions according to the alternative blockchain policy rules.

7. A system for retrieving and applying dynamic policy rules in a network, the system comprising:

a central unit which is connected with a Policy Server of a blockchain: based Policy Store Platform, the central unit configured to receive a request for one or more tasks from a requesting client and transmit the one or more tasks to the Policy Server with data indicating attributes concerning the one or more tasks;

the Policy Server configured to transmit the one or more tasks to a blockchain network of the blockchain-based Policy Store Platform so that the one or more tasks are analyzed by a predictor component of the blockchain network with the attributes and stored data of blockchain: based policies in correlation with network capabilities that satisfy the one or more requested task attributes are retrieved so that a list of blockchain policy rules that satisfy the one or more tasks are transmitted by the Policy Server to one or more service clients and/or the at least one requesting client via the central unit so that the list of blockchain policy rules that satisfy the one or more tasks are utilized by the one or more service clients and/or the at least one requesting client.

8. The system of claim 7, wherein the system also comprises:

a device of a surveillance or governmental organization configured to accept and agree to at least one policy rules condition determined by the central unit, the one or more service clients.

9. The system of claim 8, wherein the at least one requesting client and the one or more service clients are registered and/or subscribed to the blockchain based Policy Store Platform via a client application interface and wherein the Policy Server is a service provider device which interacts as an intermediate message broker among the blockchain network and the client application interface.

10. The system of claim 9, wherein the one or more service clients comprise a device of an agent or callee which can provide services and/or the at least one requesting client comprises a device of a requester or caller having a task request.

11. The system according to claim 7, wherein the blockchain network comprises device having a database stored in a non-transitory memory; and the predictor component configured to use blockchain mining and predictor algorithms to provide predictive models and/or to make decisions for transmitting a requested task.

12. The system of claim 7, wherein the central unit is an Emergency Service Routing Proxy (ESRP), the one or more service clients include at least one Public Safety Answering Point (PSAP); and the at least one requesting client includes at least one a telecommunication service provider (TSP).

* * * * *